US009544628B2

(12) United States Patent
Mack et al.

(10) Patent No.: US 9,544,628 B2
(45) Date of Patent: *Jan. 10, 2017

(54) METHOD AND APPARATUS FOR NETWORK BASED ADAPTIVE STREAMING (71) Applicant: Google Technology Holdings LLC, Mountain View, CA (US)

(72) Inventors: Robert E. Mack, Collegeville, PA (US); Lawrence D. Vince, Lansdale, PA (US); Niranjan R. Samant, Lansdale, PA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,768

(22) Filed: Dec. 7, 2015

(65) Prior Publication Data
US 2016/0088331 A1  Mar. 24, 2016

Related U.S. Application Data (63) Continuation of application No. 13/298,338, filed on Nov. 17, 2011, now Pat. No. 9,225,762.

(51) Int. Cl.
H04H 60/32 (2008.01)
H04N 7/173 (2011.01)
(Continued)

(52) U.S. Cl.
CPC ...... H04N 21/2662 (2013.01); H04L 65/4076 (2013.01); H04L 65/605 (2013.01); H04L 65/80 (2013.01); H04N 21/4621 (2013.01)

(58) Field of Classification Search
CPC .................................................. H04N 21/2102
USPC .............................. 725/14, 93, 96, 116, 146
See application file for complete search history.

(56) References Cited

U.S. PATENT DOCUMENTS 8,018,934 B2    9/2011  Liu
2004/0255148 A1  12/2004  Monteiro et al.
(Continued)

FOREIGN PATENT DOCUMENTS

KR  20110065312  6/2011
WO     0072517    11/2000

OTHER PUBLICATIONS

Kevin J Ma et al: "DRM workflow analysis for over-the-top HTTP segmented delivery", Multimedia and Expo (ICME). 2011 IEEE International Conference on. IEEE, Jul. 11, 2011 (Jul. 11, 2011 ). pp. 1-4.

(Continued)

Primary Examiner — Gigi L Dubasky
(74) Attorney, Agent, or Firm — Lowenstein Sandler LLP (57) ABSTRACT A method and apparatus for streaming Over-the-Top (OTT) content on a network to subscribers is described. A digital video transport stream of an item of the OTT content is obtained via unicast streaming methods of a resolution and bit rate selected from an available set of different resolutions and bit rates for the digital video transport stream. The digital video transport stream of the selected resolution and bit rate is transmitted in the form of an IP multicast over the network to subscribers. Bandwidth utilization of the network is monitored so that switching of the bit rate to a different bit rate for the digital video transport stream can be controlled to provide adaptive rate control of the IP multicast.

20 Claims, 5 Drawing Sheets (51) Int. Cl.
*H04N 7/16* (2011.01)
*H04N 21/2662* (2011.01)
*H04L 29/06* (2006.01)
*H04N 21/462* (2011.01)

(56) References Cited

U.S. PATENT DOCUMENTS

| | | | |
|---|---|---|---|
| 2007/0233889 A1 | 10/2007 | Guo et al. | |
| 2008/0075285 A1* | 3/2008 | Poli | H04N 7/1675 380/211 |
| 2008/0282307 A1* | 11/2008 | McDonald | H04N 7/17318 725/114 |
| 2010/0260179 A1 | 10/2010 | Bae et al. | |
| 2010/0299552 A1 | 11/2010 | Schlack et al. | |
| 2011/0093617 A1 | 4/2011 | Igarashi | |
| 2011/0119703 A1 | 5/2011 | Schlack et al. | |
| 2011/0145430 A1 | 6/2011 | Ha et al. | |
| 2012/0023533 A1 | 1/2012 | Wang et al. | |
| 2012/0198506 A1* | 8/2012 | Joe | H04N 21/44209 725/97 |

OTHER PUBLICATIONS

Joai 0 Espadanal Gona PRG Alves et al: "Implementing a QoS-aware. context-aware and personalized WebTV", Proc. of 2010 6th Conference on Next Generation Internet (NGI2010). Jun. 2-4, 2010. Paris. France. IEEE. Piscataway. NJ. USA. Jun. 2, 2010 (Jun. 2, 2010). pages 1-8.

Patent Cooperation Treaty, International Search Report and Written Opinion of the International Searching Authority for International Application No. PCT/US2012/063489, Feb. 20, 2013, 17 pages.

Pantos, R., May, W., "HTTP Live Streaming," Internet Engineering Task Force (IETF), draft-pantos-http-live-streaming-07, Sep. 2011.

Hartung, Frank, Kesici, Sinan, and Catrein, Daniel, "DRM Protected Dynamic Adaptive HTTP Streaming", in Proceedings of the Second Annual ACM Conference on Multimedia Systems (MMSys '11 ). ACM, New York, NY, USA, pp. 277-282, Feb. 2011.

Timmerer, Christian and Muller, Christopher, "HTTP Streaming of MPEG Media," Proceedings of the Streaming Day 2010, Udine, Italy, Sep. 2010.

Stockhammer, Thomas, "MPEG's Dynamic Adaptive Streaming over HTTP—An Enabling Standard for Internet TV", Third W3C Web and TV Workshop, Hollywood, CA, USA, Sep. 2011.

"Digital Video Broadcasting (DVB); Specification for Service Information (SI) in DVB Systems", European Telecommunication Standard, 2nd Edition, Jan. 1997.

Zambelli, Alex, "IIS Smooth Streaming Technical Overview", Microsoft Corporation, Windows Server Internet Information Services 7.0, Mar. 2009.

Hunter, Philip, "OTT content will only scale with seamless integration of unicast, multicast", Broadcast Engineering, Apr. 4, 2011.

\* cited by examiner

FIG. 3B ized utilization of the network operator's access network. This type of service and content is referred to as Over-the-Top (OTT) because the OTT service typically rides on top of the network operator's service yet may not be otherwise affiliated with the network operator or the network operator's services. One example of an OTT service is Internet Protocol Television (IPTV) which refers to a service of providing video, audio and/or data content in the form of IP packets provided by a Service Provider over a closed network, such as a Data Over Cable (DOC) network. Thus, IPTV can be offered as an OTT service over an existing network of a network operator to customers connected to the network. In this manner, OTT provides the ability to offer linear broadcast television (TV) as a unicast IP service to subscribers both within and outside of a Service Provider's network. As used herein, the term "unicast" refers to a communication between a single sender and a single receiver over a network.

METHOD AND APPARATUS FOR NETWORK BASED ADAPTIVE STREAMING

RELATED APPLICATIONS

This continuation application claims priority to U.S. patent application Ser. No. 13/298,338 filed on Nov. 17, 2011 and is incorporated by reference herein.

FIELD

Method and apparatus for streaming and distributing Over-the-Top (OTT) service and content to subscribers over a broadband network such as a multiple service operator (MSO) network are described.

BACKGROUND

Network operators typically distribute and deliver services and content over their network, such as cable television services over a cable network. In some cases, services and content of entities other than the network operator are distributed over the network operator's network resulting in increased utilization of the network operator's access network. This type of service and content is referred to as Over-the-Top (OTT) because the OTT service typically rides on top of the network operator's service yet may not be otherwise affiliated with the network operator or the network operator's services. One example of an OTT service is Internet Protocol Television (IPTV) which refers to a service of providing video, audio and/or data content in the form of IP packets provided by a Service Provider over a closed network, such as a Data Over Cable (DOC) network. Thus, IPTV can be offered as an OTT service over an existing network of a network operator to customers connected to the network. In this manner, OTT provides the ability to offer linear broadcast television (TV) as a unicast IP service to subscribers both within and outside of a Service Provider's network. As used herein, the term "unicast" refers to a communication between a single sender and a single receiver over a network.

In addition, a service provider may create their own unicast based "adaptive or progressive" streaming service to distribute content to portable devices, such as tablets, computers, smart phones, and the like. Some of the subscribers to this particular service may be connected to another service provider's network while some subscribers may be connected to the service provider's access network. Thus, the service provider may distribute the same OTT services to portable devices within subscriber homes connected to the service provider's access network. In other words, OTT can be an adjunct service offering for subscribers on other service provider networks, and can also enhance the experience of on-network subscribers (e.g., by supporting their portable devices).

When additional OTT content is deployed on a network, such as a significant number of new High Definition (HD) services over an existing distribution network of a network operator, a result may be that the distribution network becomes capacity constrained due to bandwidth requirements needed to fulfill the OTT service. As an example, the QAM plant may be at or near capacity, and the IP distribution network may not be sized to carry all the HD services being planned, particularly since the new OTT services require a unicast infrastructure. Further complicating the addition of OTT content is that it may be desired to deploy technology that can be leveraged to source these HD services to Set Top Boxes (STBs) or like Customer Premise Equipment (CPE) that have different IP capabilities (i.e., none to advanced) and to a variety of different mobile, PC, and tablet customer devices with varying IP capabilities (i.e., resolution, etc.) within the home or on wireless networks.

Simply by way of example, an existing IP video distribution network may not have sufficient capacity to deliver a desired 100 new HD services using a unicast OTT distribution method. For instance, assuming that the network's available capacity is uniformly distributed among all potential subscriber homes, there may be on average approximately 3.5 Mbps available for IPTV video services into each home. In this example, if 50% of the subscribers requested one of the new HD services (8 Mbps/service on average), the existing network would be oversubscribed.

The cost to add capacity to a distribution network is typically too exorbitant to consider as a solution to the above referenced problem. Accordingly, there exists a need for a method and apparatus that provide cost and bandwidth efficiencies to enable a capacity constrained network to effectively and efficiently promote the utilization of new content and services prepared for Over-the-Top (OTT) distribution to a population of subscribers, such as via legacy STBs or the like. Further, it may be desirable for such a method and apparatus to permit both next generation IPTV devices and legacy STBs to share a common video path infrastructure, even if the legacy network is capacity constrained.

SUMMARY

This disclosure describes a method of streaming Over-the-Top (OTT) content on a network to subscribers. A digital video transport stream of an item of the OTT content is obtained via unicast streaming and of a resolution and bit rate selected from an available set of different resolutions and bit rates for the digital video transport stream. The digital video transport stream of the selected resolution and bit rate is transmitted in the form of an IP multicast over the network to subscribers. Bandwidth utilization of the network is monitored so that switching of the bit rate to a different bit rate for the digital video transport stream can be controlled to provide adaptive rate control of the IP multicast.

This disclosure also describes apparatus for streaming Over-the-Top (OTT) content on a network to subscribers. The apparatus includes a streamer located at a headend of the network configured to obtain a Moving Pictures Experts Group (MPEG) transport stream of an item of the OTT content of a resolution and bit rate selected from a set of different resolutions and bit rates and to transmit the MPEG transport stream to subscribers in the form of an IP multicast over the network. The apparatus also includes a Session Resource Manager (SRM) located at the headend of the network for controlling the resolution and bit rate of the MPEG transport stream obtained and transmitted by the streamer to thereby enable adaptive rate control of the IP multicast.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
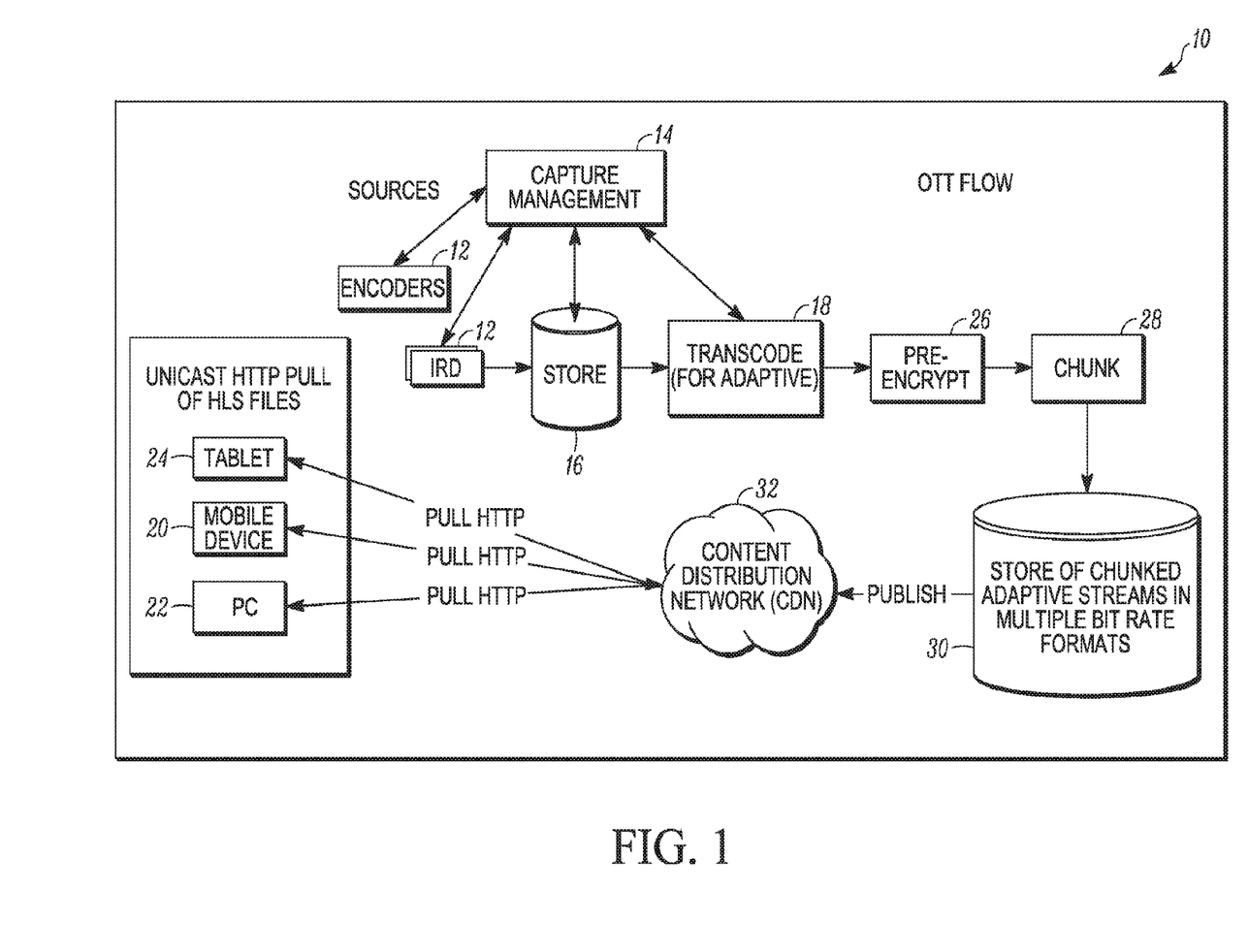
FIG. 1 is a schematic view of unicast OTT infrastructure and video stream processing flow in accordance with an embodiment.

FIG. 1 illustrates a typical video processing path 10 involved in the creation and distribution of IPTV services based on OTT technology. Thus, FIG. 1 illustrates so-called unicast OTT infrastructure that typically exists for a broadband network such as a multiple service operator (MSO) network.

Source devices 12, such as IRDs, Encoders, or any other source of video/audio content, provide OTT content as MPEG packets within an IP datagram stream to the headend of the network. A Capture Management System 14 may store the content in a storage unit 16 for future processing and playout, or the content may be made available in substantially real-time or after a pre-determined time delay and be provided to a transcoder 18. For purposes of this disclosure, "real-time" includes a level of responsiveness that is sufficiently fast to keep up with the rate of processing the OTT content as well as a level of responsiveness that tolerates a degree of lateness or built-in delay.

The content passes through a transcoding process in the transcoder 18 whereby a single input stream is turned into a "bouquet" of streams, each encoded into a different resolution format and bit rate. The term "bouquet" as used herein refers to a collection of related streams, each constituting a unique bit rate and resolution pairing derived from the same original MPEG service. Typically, the original MPEG service is of the highest quality and may be referred to as a "golden copy". For example, a 1080i/30 or 720p/60 resolution service at 19.2 Mbps may be the golden copy MPEG service that can be used to derive lower bit rate and quality versions of that service. The multiplicity of different stream formats and bit rates enables the OTT content to be sourced to devices with different capabilities, such as Smart Phone 20, personal computer 22, and tablet computer 24. In addition, the different bit rates support adaptive streaming, whereby the receiving client has the ability to measure network congestion and request a lower or higher bit rate stream from the source. This may eliminate visual impairments caused by network congestion (e.g. macro-blocking due to dropped packets, frozen frames) at the expense of higher resolution video.

After transcoding, the bouquet of streams is encrypted in an encryptor or pre-encryptor 26 and then chunked in a chunker 28. The chunking process breaks each stream into time slices (e.g. 10 second period) and places the stream of packets for that period into a standard file format container that includes the packets and metadata describing the content (e.g. MP4 container). The files are placed on a server 30 that can publish them to a Content Distribution Network (CDN) 32 for smart distribution to the edges of the network (i.e., to Smart Phone 20, personal computer 22, tablet computer 24, and like customer devices or Customer Premise Equipment (CPE)).

Client devices 20, 22 and 24 pull the files from CDN 32 by using standard unicast HTTP Gets. An example of a typical adaptive streaming protocol is unicast HTTP Live Streaming (HLS). Other examples of adaptive streaming protocol include HTTP Dynamic Streaming (HDS) and IIS Smooth Streaming. The adaptive clients (such as HLS clients) continuously measure network performance and adaptively request other file chunks containing higher or lower bit rate streams depending on the dynamic bandwidth that the network can support.

Figure 2A:
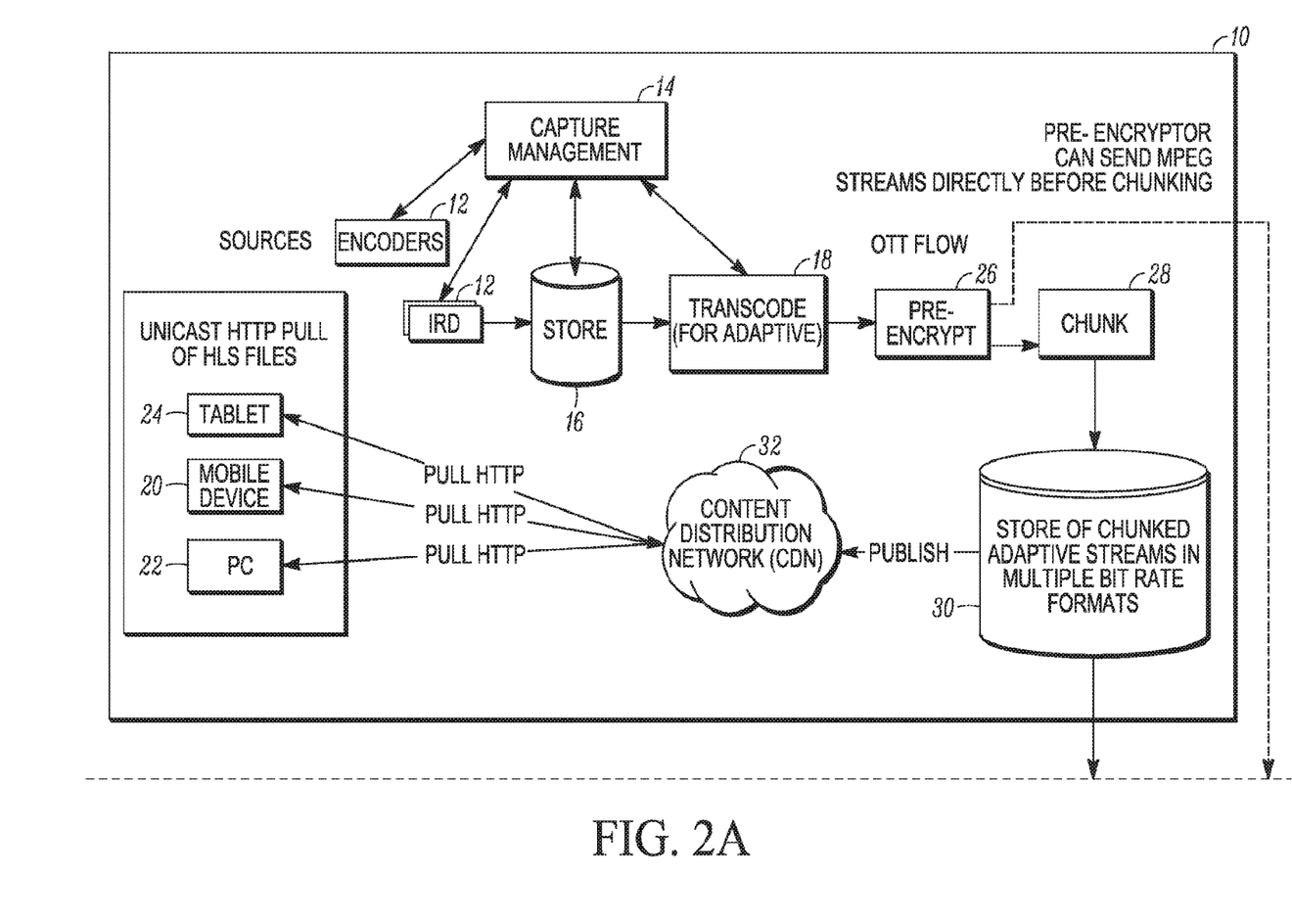
FIGS. 2A and 2B are a schematic view of the OTT infrastructure and video stream processing flow of FIG. 1 in combination with an adaptive rate IP multicast system in accordance with another embodiment.
Figure 2B:
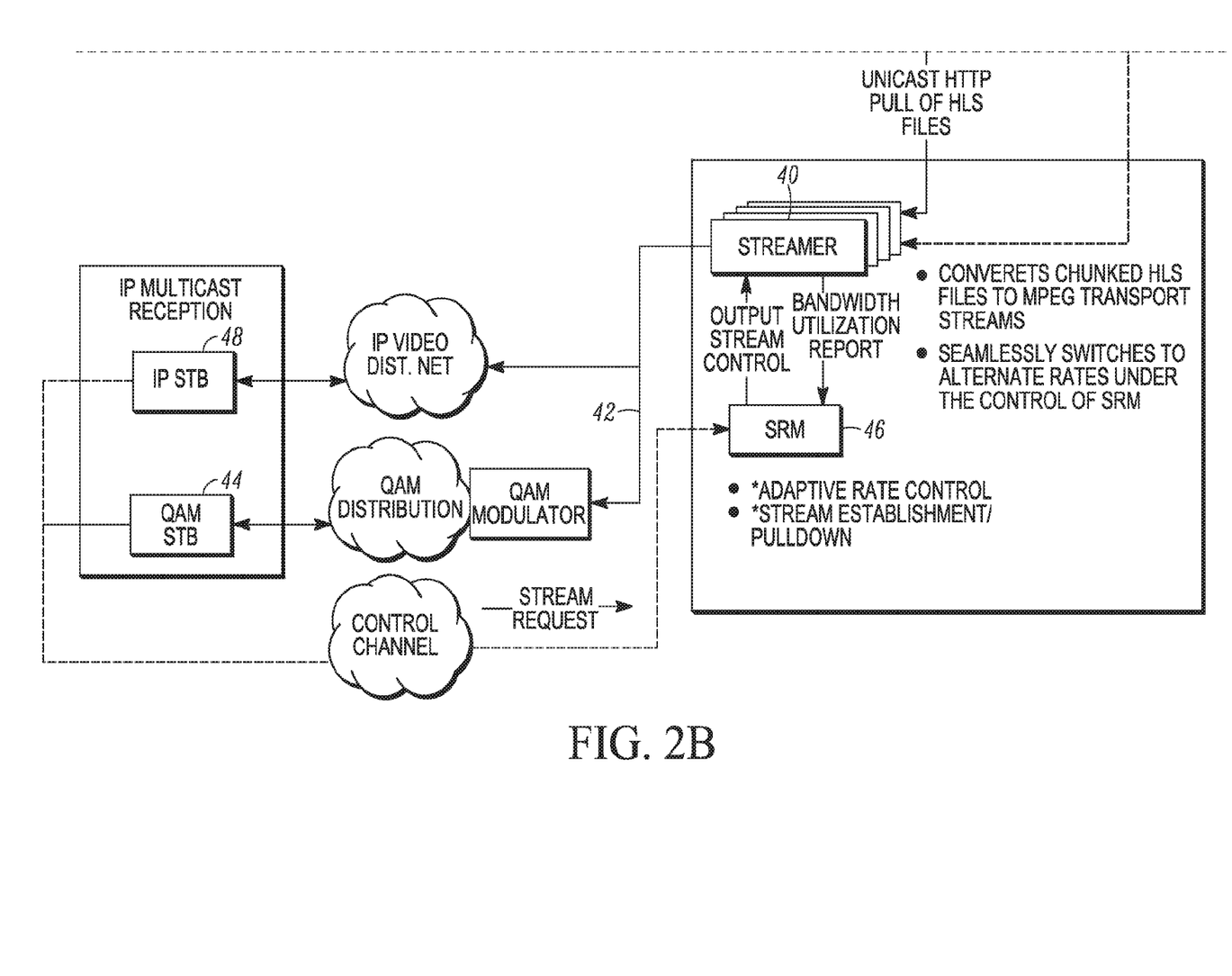

FIG. 2 illustrates an alternate or an additional system that provides cost and bandwidth efficiencies for delivering and processing OTT content on an otherwise capacity-constrained network. As described above, the part of the system encapsulated within the upper box represents the OTT content and existing infrastructure to be deployed. The remaining part of the system shown in FIG. 2 represents the portion of the system added to deliver additional OTT services, such as IPTV services to IP STBs 48 and QAM STBs 44 leveraging the existing OTT technology infrastructure.

The Streamer 40 pulls the HLS files stored on the CDN origin server (or other storage server) 30 and reconstructs a fully compliant MPEG transport stream from the files for transmission from the Streamer 40 via IP multicast. Because the Streamer 40 can pull HLS files from the origin server 30 and can translate them to a complaint MPEG transport stream, the existing OTT infrastructure is fully leveraged. As a contemplated option, the Streamer 40 can alternatively receive the MPEG transport streams (before chunking) directly from the Encryptor 26. In this case, the Streamer 40 would not have to reconstruct the transport streams from container files.

Because the network 42 for the legacy STBs 44 may be a bandwidth constrained network, that is also managed (QoS, bandwidth controlled), the use of IP multicast is more efficient from a capacity utilization point of view than using unicast HTTP. As an example, if an existing network supports roughly 6 Gbps of capacity, within the network, to support approximately 1800 homes for IP video distribution, and if 50% of the users attempted to pull one of 100 different HD channels to be offered over IP, then 900 STBs would be pulling a unique unicast stream from the CDN 32 over the network according to the arrangement described with respect to FIG. 1. If each stream is 8 Mbps, then the total required capacity is 900*8 Mbps=7.2 Gbps. In this example, the network would be oversubscribed and would change bit rates of the unicast streams adaptively, which lowers quality. In contrast, if the multicast system described in FIG. 2 is used, even if all 100 Streams were being requested, the bandwidth required is 100*8 Mbps=800 Mbps, or an order of magnitude less than that required for the system of FIG. 1. Accordingly, there is no need to change the bit rate in this example for the multicast system since it will be well below capacity thereby permitting high quality video to be maintained.

In FIG. 2, the Streamer 40 provides a control interface to the Session Resource Manager (SRM) 46. A group of Streamers 40 provides bandwidth utilization reports to the SRM 46 which has knowledge of the available bandwidth that has been allocated for video through the network 42. When the SRM 46 determines that the network 42 is approaching capacity, based on the set of Streamer utilization reports, the SRM 46 can take action based on policy rules configured on the device. For example, the SRM 46 can send control messages to a particular streamer or group of streamers 40 to pull a lower resolution/bit rate set of HLS files from those stored on the Origin server 30, or a lower bit rate stream from the encryptor 26. In this way, the SRM 46 and Streamer 40 provide network level adaptive bit rate control for a given service for the entire IP/QAM STB population, 44 and 48, served by that part of the network 42, rather than requiring each STB, 44 and 48, to have an adaptive client to request a lower resolution/bit rate set of files during times of network congestion. The lower bit rate stream is streamed on the same multicast not requiring the STB, 44 and 48, to join an alternate multicast. The STB, 44 and 48, is only required to adapt to the lower bit rate gracefully. This may require the Streamer 40 to condition the stream appropriately to prevent glitches at the decoder.

The SRM 46 also receives stream requests from the client STBs, 44 and 48, and switches a requested multicast stream onto the IP network 42 if the requested multicast stream is not already streaming. This is similar functionality offered by Switched Digital Video (SDV) Managers. By performing switched IP multicast and only placing content on the IP network 42 when required, additional bandwidth efficiencies can be realized in an IP multicast environment.

The arrangement described above for FIG. 2 allows a common OTT infrastructure to be deployed for the reception, transcoding, encryption, and storage of video services supporting all device types, including mobile 20, PCs 22, tablets 24, legacy STBs 44 and IP STBs 48. This system minimizes utilized bandwidth as linear broadcasts are offered via IP multicast versus HTTP unicast, allowing more efficient use of constrained IP network capacity. The system provides a policy based adaptive streaming capability at the network level so the benefits of adaptive streaming can be realized if the IP network is congested without the need to deploy adaptive clients in all legacy and IP STBs. The policy management algorithm can make dynamic decisions about the bandwidth available for ad content and can add more ad streams as the network utilization decreases (e.g. when more people join a particular multicast because of its popularity).

In addition, the above described technique permits a service provider/network operator to use the same infrastructure (equipment used to create the adaptive streams) to offer a "pseudo"—adaptive service to his IP STB population as well, in a very efficient manner. This is because adaptive multicast to such client devices is driven from the network and not the client (like in adaptive streaming). Essentially, the streamer 40 permits the service provider/network operator to tap into the OTT service infrastructure that the service provider/network operator put in place and can translate from unicast to multicast while enabling bandwidth management by the service provider/network operator instead of the user. Thus, this system allows a service provider/network operator to invest in OTT infrastructure (transcoders, packagers, encryptors, etc.) to source an OTT service to on and off network portable devices and, with a little more investment (streamer, SRM, etc.), the service provider/network operator can use the same infrastructure to source to IP STBs (and QAM STBs) with capacity management over a constrained IP/QAM network.

By way of example, a service provider/network operator can carve its access network up into managed and unmanaged "pipes". Portable devices with adaptive clients can pull their respective unicasts. As the capacity of this part of the "pipe" or network becomes constrained, the clients could all adaptively move to lower and lower bit rates affecting the video quality. The managed "pipe" could source the adaptive multicast content to IP STBs or other devices capable of receiving a multicast. If this part of the network becomes constrained, the SRM could lower the offered bit rate within a give multicast based on policy. The effect is that the bandwidth of the network is better managed because the control is with the network SRM and distributed among many unicast clients. This puts control of network usage in the hands of the service provider/network operator for the part of the access network the service provider/network operate dedicates to managed devices.

Figure 3A:
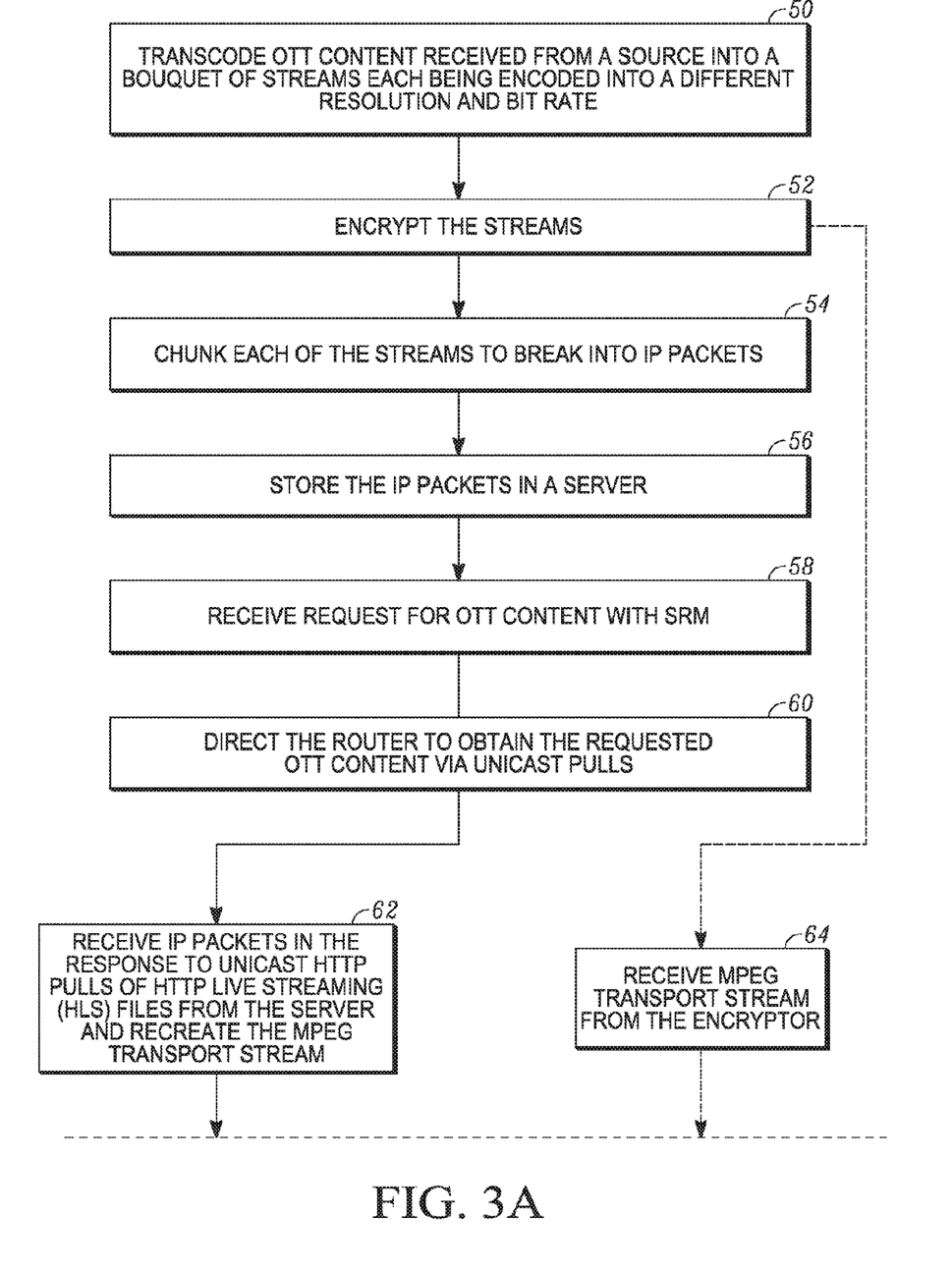
FIGS. 3A and 3B are a flowchart of process steps for delivering OTT content to customer devices in accordance with the embodiment shown in FIG. 2.
Figure 3B:
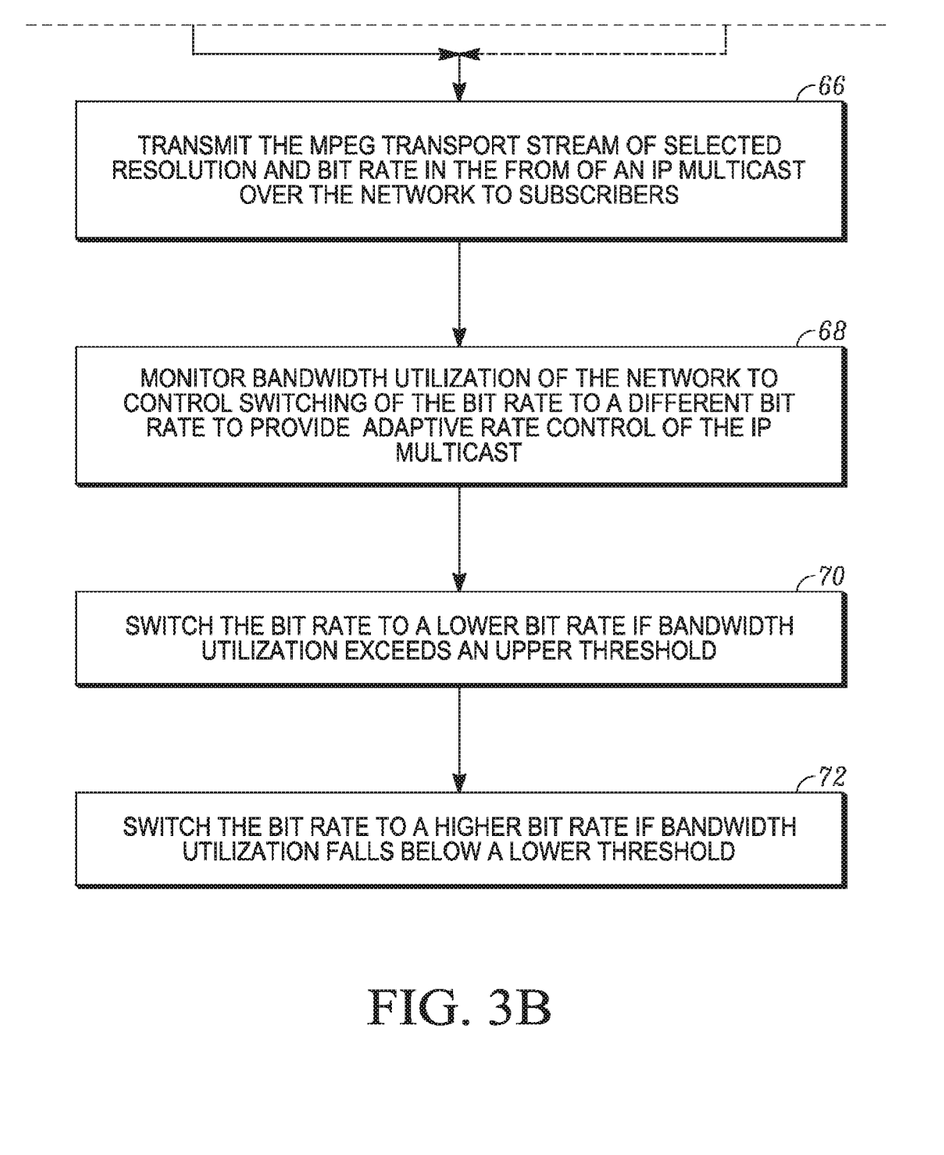

By way of further explanation, FIG. 3 illustrates process steps for streaming Over-the-Top (OTT) content on a network to subscribers. As discussed with respect to FIG. 1, the process steps of the existing OTT infrastructure remain essentially the same. For instance, OTT content is received from a source and transcoded in step 50 into a bouquet of streams with each of the bouquet of streams encoded into a different resolution and bit rate to enable the OTT content to be sourced to customer devices of different IP capabilities and to support adaptive rate streaming. The bouquet of streams are then subject to encrypting in step 52 and chunking in step 54 such that each of the bouquet of streams is separated into a plurality of IP packets which can be stored in step 56 in the server 30 at the headend of the network.

The SRM 46 can receive a request in step 58 from a customer device, such as STB, 44 or 48, for a particular item of the OTT content. The SRM 46 in step 60 then directs the streamer 40 to obtain and transmit the particular requested item of the OTT content over the network 42. The streamer 40 obtains a digital video transport stream for the requested item of the OTT content of a resolution and bit rate selected from an available set of different resolutions and bit rates in one of the following ways. In step 62, the streamer 40 receives IP packets of the requested item of OTT content in response to unicast HTTP pulls of HTTP Live Streaming (HLS) files from the server 30 and recreates a MPEG transport stream from the IP packets. As an alternative, in step 64, the streamer 40 receives the digital video transport streams directly from the encryptor 26 (in a form before chunking of the OTT content). In step 66, the digital video transport stream of a selected resolution and bit rate is transmitted across the network 42 to the STBs 44 and 48 in the form of an IP multicast.

In step 68, the SRM monitors bandwidth utilization of the network 42 during the obtaining and transmitting steps and controls switching of the bit rate to a different bit rate for the digital video transport stream during the obtaining and transmitting steps to provide adaptive rate control of the IP multicast. For example, if bandwidth utilization on the network 42 monitored during the monitoring step 68 exceeds an upper pre-set bandwidth utilization threshold, the bit rate of the digital video transport stream will be switched to a lower bit rate. See step 70. Alternatively, if bandwidth utilization on the network 42 falls below a lower pre-set bandwidth utilization threshold, the bit rate of the digital video transport stream will be switched to a higher bit rate, if possible. See step 72. Steps 70 and 72 can be accomplished by switching the unicast HTTP pulls of the HLS files from the server 30 to HLS files of a higher or lower bit rate.

All of the above steps occur automatically as set by the network operator to ensure the efficient use of IP network capacity. This system provides a policy based adaptive streaming capability at the network level so the benefits of adaptive streaming can be realized if the IP network is congested without the need to deploy adaptive clients in all legacy and IP STBs.

The devices, units, modules, servers, streamers, routers, and storage discussed above can physically be provided on a circuit board or within an electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

We claim:

1. A method comprising:
obtaining, by unicast streaming, a digital video stream of an item of Over-the-Top (OTT) content having a bit rate from a set of bit rates for the digital video stream;
transmitting, by multicast streaming over a network to devices, the digital video stream having the bit rate; and
switching, by a processor, the bit rate for the digital video stream to a different bit rate from the set of bit rates to provide adaptive control of the multicast stream based on a monitoring of bandwidth utilization of the network during the transmitting, wherein the switching of the bit rate obtains the digital video stream at the different bit rate from the unicast streaming,
wherein unicast pulls associated with the unicast streaming of the digital video stream from a server of the network are switched to a higher bit rate when the monitored bandwidth utilization of the network is below a lower bandwidth utilization threshold and the unicast pulls are switched to a lower bit rate when the monitored bandwidth utilization of the network exceeds an upper bandwidth threshold.

2. The method of claim 1, wherein the devices correspond to set top boxes (STBs).

3. The method of claim 2, further comprising:
receiving a request from one of the STBs for another item of the OTT content; and
in response to identifying that the another item of the OTT content is not currently transmitted by the multicast streaming over the network, transmitting another digital video stream corresponding to the requested another item of the OTT content.

4. The method of claim 1, further comprising:
transcoding the OTT content received from a source into a plurality of streams, each of the plurality of streams encoded into a different bit rate;
encrypting, after the transcoding, the plurality of streams;
chunking, after the encrypting, each of the plurality of streams to break each of the plurality of streams into a plurality of Internet Protocol (IP) packets; and
storing the IP packets in the server of the network.

5. The method of claim 1, wherein the switching of the unicast pulls to the higher bit rate comprises selecting a streaming file corresponding to the higher bit rate, and the switching of the unicast pulls to the lower bit rate comprises selecting another streaming file corresponding to the lower bit rate.

6. The method of claim 1, wherein the digital video stream is a Moving Pictures Experts Group (MPEG) transport stream.

7. The method of claim 1, wherein the switching of the bit rate is performed by a streamer located at a headend of the network.

8. A system comprising:
a memory; and
a processor operatively coupled with the memory to:
obtain, by unicast streaming, a digital video stream of an item of Over-the-Top (OTT) content having a bit rate from a set of bit rates for the digital video stream;
transmit, by multicast streaming over a network to devices, the digital video stream having the bit rate; and
switch the bit rate for the digital video stream to a different bit rate from the set of bit rates to provide adaptive control of the multicast stream based on a monitoring of bandwidth utilization of the network during the transmitting, wherein the switching of the bit rate obtains the digital video stream at the different bit rate from the unicast streaming,
wherein unicast pulls associated with the unicast streaming of the digital video stream from a server of the network are switched to a higher bit rate when the monitored bandwidth utilization of the network is below a lower bandwidth utilization threshold and the unicast pulls are switched to a lower bit rate when the monitored bandwidth utilization of the network exceeds an upper bandwidth threshold.

9. The system of claim 8, wherein the devices correspond to set top boxes (STBs).

10. The system of claim 9, wherein the processor is further to:
receive a request from one of the STBs for another item of the OTT content; and
in response to identifying that the another item of the OTT content is not currently transmitted by the multicast streaming over the network, transmit another digital video stream corresponding to the requested another item of the OTT content.

11. The system of claim 8, wherein the processor is further to:
transcode the OTT content received from a source into a plurality of streams, each of the plurality of streams encoded into a different bit rate;
encrypt, after the transcoding, the plurality of streams;
chunk, after the encrypting, each of the plurality of streams to break each of the plurality of streams into a plurality of Internet Protocol (IP) packets; and
store the IP packets in the server at the network.

12. The system of claim 8, wherein to switch the unicast pulls to the higher bit rate, the processor is to select a streaming file corresponding to the higher bit rate, and wherein to switch the unicast pulls to the lower bit rate the processor is to select another streaming file corresponding to the lower bit rate.

13. The system of claim 8, wherein the digital video stream is a Moving Pictures Experts Group (MPEG) transport stream.

14. The system of claim 8, wherein the switching of the bit rate is performed by a streamer located at a headend of the network.

15. A non-transitory machine-readable storage medium storing instructions which, when executed by a processor, cause the processor to perform operations comprising:
obtaining, by unicast streaming, a digital video stream of an item of Over-the-Top (OTT) content having a bit rate from a set of bit rates for the digital video stream;

transmitting, by multicast streaming over a network to devices, the digital video stream having the bit rate; and switching the bit rate for the digital video stream to a different bit rate from the set of bit rates to provide adaptive control of the multicast stream based on a monitoring of bandwidth utilization of the network during the transmitting, wherein the switching of the bit rate obtains the digital video stream at the different bit rate from the unicast streaming, wherein unicast pulls associated with the unicast streaming of the digital video stream from a server of the network are switched to a higher bit rate when the monitored bandwidth utilization of the network is below a lower bandwidth utilization threshold and the unicast pulls are switched to a lower bit rate when the monitored bandwidth utilization of the network exceeds an upper bandwidth threshold.

16. The non-transitory machine-readable storage medium of claim 15, wherein the devices correspond to set top boxes (STBs).

17. The non-transitory machine-readable storage medium of claim 16, the operations further comprising:

receiving a request from one of the STBs for another item of the OTT content; and in response to identifying that the another item of the OTT content is not currently transmitted by the multicast streaming over the network, transmitting another digital video stream corresponding to the requested another item of the OTT content.

18. The non-transitory machine-readable storage medium of claim 15, the operations further comprising:

transcoding the OTT content received from a source into a plurality of streams, each of the plurality of streams encoded into a different bit rate;

encrypting, after the transcoding, the plurality of streams;

chunking, after the encrypting, each of the plurality of streams to break each of the plurality of streams into a plurality of Internet Protocol (IP) packets; and storing the IP packets in the server at the network.

19. The non-transitory machine-readable storage medium of claim 15, wherein the switching of the unicast pulls to the higher bit rate comprises selecting a streaming file corresponding to the higher bit rate and the switching of the unicast pulls to the lower bit rate comprises selecting another streaming file corresponding to the lower bit rate.

20. The non-transitory machine-readable storage medium of claim 15, wherein the switching of the bit rate is performed by a streamer located at a headend of the network.

* * * * *